Patented Sept. 3, 1940

2,213,260

UNITED STATES PATENT OFFICE 2,213,260

PLANT STIMULANT

George R. Rinke, Old Greenwich, Conn., assignor to John Powell & Co., Inc., New York, N. Y., a corporation of New York No Drawing. Application January 18, 1938, Serial No. 185,517

6 Claims. (Cl. 71—2)

This invention relates to plant stimulants and has for an object to provide a plant stimulant composition which, when properly applied to plants of the annual varieties, will result in an increased crop.

More particularly, the invention relates to a plant stimulant powder adapted to be applied to the leaves of growing plants and comprising as constituents a quantity of pyrethrum bearing powder together with a limited proportion of petroleum or vegetable oil, with or without suitable diluents. The diluent, if any is used, may consist of inert powder such as talc, clay or diatomaceous earth, or of powders having known utility such as sulphur or organic materials. The diluent may, of course, include a mixture of one or more of the above ingredients.

I have found that a proper mixture of pyrethrum bearing powder with certain oils, with or without a suitable diluent, has a very pronounced effect in stimulating crop production, the effect having been the most notably observed and measured up to the present time in connection with potato plants which have been found to produce from 40 to 100 bushels more of potatoes per acre when treated than when not treated.

These results have been checked under both open field and hot house conditions so as to avoid the possibility of erroneous conclusions being drawn because of the known insecticidal effect of pyrethrum powder.

The insecticidal value of pyrethrum powder depends upon the active principle content of the powder this active principle being generally understood to be the pyrethrin content. I have found by experiment that the stimulating effect can be produced without substantial diminution where the pyrethrum powder utilized has been substantially exhausted of its pyrethrins, the conclusion being, therefore, that the stimulation is apparently not due to any insecticidal value of the pyrethrum powder nor, in fact, to any pyrethrins which may be included in the powder.

Exhausted pyrethrum powder appears to be of equal efficacy in my plant stimulant compositions with pyrthrum powder containing all of the original pyrethrins.

Exhausted pyrethrum powder is a by-product of pyrethrin concentration processes, which processes are regularly practiced for the purpose of securing pyrethrin concentrates for use in insect sprays, such as cattle sprays or household sprays.

An example of an exhausted pyrethrum powder composition suitable for use in a plant stimulating composition may be as follows:

Ground pyrethrum flowers are used, such flowers generally containing not over 2% acid insoluble ash (sand), and not over 5% powdered pyrethrum stems. This pyrethrum powder is very largely exhausted of its pyrethrin content by any usual commercial process which leaves the residue containing about .05% pyrethrins. The volatile solvents are evaporated from the residue. To the residue, 8% or more of petroleum distillates are added, and any excess of petroleum distillate over 8% is expressed under pressure so that the typical resulting composition would be as follows:

| | Per cent |
|---|---|
| (D) Petroleum distillates | 8.00 |
| Pyrethrins | .05 |
| Acid insoluble ash not over | 1.84 |
| Powdered pyrethrum stems not over | 4.6 |
| Powdered pyrethrum flowers | 85.51 |
| Total | 100.00 |

There are also present small amounts of iron, silica, potassium, chloride, calcium carbonate and calcium phosphate.

The petroleum distillates used are in the kerosene class, and may extend from the heavier oils down through approximately Stoddard Solvent, which latter begins to get into the volatile class. The petroleum distillates which may be advantageously employed comprehend all petroleum oils having a Saybolt viscosity of from 30 to 46 at 100° F.

The inclusive gravities A. P. I. range from 51–36. The inclusive flash points TAG, closed cup, range from 100–275° F. The inclusive fire points TAG, closed cup, range from 160–300° F. The inclusive boiling points range from 300 to 670° F.

A proper mixture for plant stimulating purposes desirably consists of 25% of the mixture D, with 75% of a dry diluent such as sulphur, talc, clay, diatomaceous earth or powdered organic material. It is not necessary, however, that any diluent be employed so long as care is taken to reduce the petroleum distillate content to between 1 and 4% of the resulting total composition. Where diluents are used they may consist either of an inert powder as exemplified by talc, clay and diatomaceous earth, or they may consist of powders having known anti-parasitical value as exemplified by sulphur.

As a further example of a proper mixture for plant stimulating purposes, and in this instance the mixture also has pronounced insecticidal value, the D powder composition may be mixed in equal quantity with dry powdered pyrethrum which has not been exhausted of its pyrethrins. The resulting composition includes substantially 0.5% pyrethrins, while the percentage of petroleum distillates is diminished by dilution to approximately 4%.

The resulting composition (which will be designated A) may be diluted as much as 75% with a dry diluent such as sulphur, talc, diatomaceous earth or powdered organic material. This reduces the petroleum distillate content of the resulting plant stimulant composition to 1%. Petroleum distillate may be added to increase the percentage to as much as 4%.

Alternatively, the resulting composition A may be diluted as much as 75% by the further addition of the D powder. In this latter case, however, the petroleum distillate should be expressed sufficiently to assure that it does not constitute more than 4% of the resulting final composition.

The importance of maintaining the total petroleum distillate constituent at a value not in excess of about 4%, results from the fact that it has been found that where larger percentages of petroleum distillate are included the composition not only fails to exert a stimulating effect but actually produces a deleterious effect resulting in the stunting of plants and in a contraction of crop yield. From 1% to about 4% petroleum distillate has been found in all instances to constitute the optimum range.

The reason why the above described illustrative compositions produce plant and crop stimulation has not been definitely ascertained. It has been ascertained, however, that the effect is secured by dusting the material onto the leaves of the growing plants. Sprinkling the material onto the ground does not stimulate either growth or crop production, but on the contrary exerts a deleterious effect.

The best procedure thus far devised for plants such as potatoes and beans consists in about five applications in the course of the growing season, each involving the application of approximately 40 lbs. of the composition per acre.

I have described what I believe to be the best embodiments of my invention. I do not wish, however, to be confined to the embodiments shown, but what I desire to cover by Letters Patent is set forth in the appended claims.

I claim:

1. A plant stimulant powder comprising, in combination, 1 to 4% of petroleum distillates having a Saybolt viscosity of 30-46 at 100° F. and 99 to 96% powder, the powder constituent including pyrethrum powder substantially exhausted of pyrethrins as at least 25% of its total composition, and the remainder of the powder constituent, if any, consisting of diluent powder.

2. A plant stimulant powder comprising, in combination, 1 to 4% of petroleum distillates having a Saybolt viscosity of 30-46 at 100° F. and 99 to 96% powder, the powder constituent including pyrethrum powder substantially exhausted of pyrethrins as at least 25% of its total composition, and the remainder of the powder constituent, if any, consisting of inert diluent powder.

3. A plant stimulant powder comprising, in combination, 1 to 4% of petroleum distillates having a Saybolt viscosity of 30-46 at 100° F. and 99 to 96% powder, the powder constituent including pyrethrum powder substantially exhausted of pyrethrins as at least 25% of its total composition, and the remainder of the powder constituent, if any, consisting of a mixture of inert and anti-parasitic or insecticidal powders.

4. A plant stimulant powder comprising, in combination, 1 to 4% petroleum distillates having a Saybolt viscosity of 30-46 at 100° F., and 99 to 96% pyrethrum powder substantially exhausted of pyrethrins.

5. A plant stimulant powder comprising, in combination, 1 to 4% of petroleum distillates having a Saybolt viscosity of 30-46 at 100° F. and 99 to 96% powder, the powder constituent including pyrethrum powder as at least 25% of its total composition and the remainder of the powder constituent, if any, consisting of a diluent powder, the powder including pyrethrins as .05 to 0.5% of its total composition.

6. A plant stimulant powder comprising, in combination, 1 to 4% of petroleum distillates having a Saybolt viscosity of 30-46 at 100° F. and 99 to 96% powder, the powder constituent including pyrethrum powder as at least 25% of its total composition and the remainder of the powder constituent, if any, consisting of a diluent powder, the pyrethrum powder including 0 to 55% of its original pyrethrins.

GEORGE R. RINKE.